Aug. 1, 1961 R. S. SINN 2,994,476
PERFORATION SENSING CIRCUIT
Filed Nov. 15, 1956 3 Sheets-Sheet 1

INVENTOR.
Robert S. Sinn
BY
ATTORNEY.

INVENTOR.
Robert S. Sinn
BY
ATTORNEY.

INVENTOR.
Robert S. Sinn
BY
ATTORNEY.

United States Patent Office 2,994,476
Patented Aug. 1, 1961

2,994,476
PERFORATION SENSING CIRCUIT
Robert S. Sinn, Pennsauken, N.J., assignor to Radio Corporation of America, a corporation of Delaware
Filed Nov. 15, 1956, Ser. No. 622,331
16 Claims. (Cl. 235—61.11)

This invention is concerned with information handling systems, and more particularly with circuits for sensing perforations in a record card or tape.

In the fields of telegraphy and data processing, perforations in a record member have long been used as the physical representation of message information. In most modern high-speed equipment, the presence or absence of a perforation in a record must be determined quickly and accurately.

As information handling rates increase, less time is available for the sensing of an individual perforation. In most brush sensing circuits of the prior art, a circuit is closed when the brush touches a contact roll through a perforation. The current transmitted through the closed circuit actuates a relay which may be considered a storage element.

At higher reading speeds the interrelated problems of "brush-bounce" and arcing become significant, imposing serious limitations on the ultimate speed of the sensing mechanism. The brush bounce interrupts the current flow, reducing the amount of power transmitted. If higher voltages are used to increase the power, then the arcing and burning of the brushes, the roll, and the record members becomes pronounced. Furthermore, as shorter sensing times are provided, circuits of the prior art, in order to do the same amount of work in closing relays, must handle even higher voltages and currents, or alternatively use more sensitive relays. However, the use of the relay also places an inherent limit on speed, with the introduction of the similar problems of "bouncing" and arcing of the relay contacts.

Accordingly, it is an object of the present invention to provide a perforation sensing circuit which will operate with shorter brush contact times than the circuits of the prior art.

It is a further object of the present invention to provide a high speed perforation sensing circuit of increased reliability over circuits of the prior art.

It is a still further object of the present invention to compensate for the effects of "noise" due to brush-bounce in a high-speed perforation sensing circuit.

A still further object of the present invention is to provide a perforation sensing circuit requiring less power flow through the brushes than the circuits of the prior art.

These and other objects of the invention are accomplished by connecting a capacitor buffer storage to the brushes for controlling a gate circuit which is connected to a source of power pulses. When enabled, the gate circuit provides a controlled power pulse output of definite amplitude and duration. The brush circuit need not carry high current or voltage loads to affect the charge of the capacitors. The sensing circuit may be devised to provide output pulses corresponding either to the presence or absence of perforations at the brushes.

In a preferred embodiment, perforated record members are transported under the brushes at a specified rate of speed. A brush encountering a perforation completes a circuit through the contact roll, charging the capacitor circuit in a relatively rapid charge time. The leakage path of the capacitor provides a discharge time that is relatively long, compared to the time interval between successive perforation sensings. During the sensing of the perforation, a power pulse of limited duration is applied to a gate circuit.

If a perforation has been encountered and the capacitor is charged, the gate circuit is enabled, and the power pulse is applied to a utilization circuit, which may, for example, be a magnetic core. If the capacitor is not charged, the gate circuit remains closed, and the power pulse cannot pass. After the occurrence of the power pulse and before the arrival of the next perforation at the brush, a restoring circuit discharges all capacitors, preparing for the arrival of the next perforation.

The output of the gating circuit may be applied to change the state of a magnetic core for instance, to represent storage of a binary digit or other element of information. The power pulse may be used with equal facility in any other type of storage device which may require more energy than can be safely transmitted through the brushes or may be utilized directly in the information system or data processing machine.

Alternative embodiments may be constructed in which the restoring circuit charges all capacitors before a perforation position arrives under the brushes. Wherever a perforation is encountered, that brush closes a discharge circuit, and, depending upon the output desired, the power pulse may or may not pass through the gating circuit.

The foregoing and other objects, the advantages and novel features of this invention, as well as the invention itself both as to its organization and mode of operation, may be best understood from the following description when read with the accompanying drawing, in which like reference numerals refer to like parts, and in which.

Figure 1:
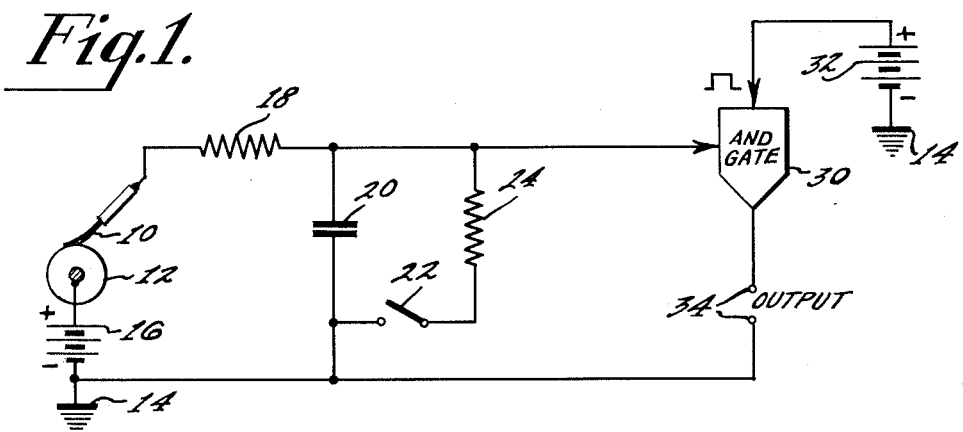
FIGURE 1 is a simplified block diagram of an arrangement according to the present invention.

FIGURE 1 is a generalized block diagram of an arrangement according to the present invention. A brush 10 is mounted adjacent a cooperating contact roll 12. The contact roll 12 is connected to a point of common reference potential designated by the conventional ground symbol 14 through a source of voltage 16. The brush 10 is returned to ground 14 through a circuit containing a resistor 18 and a capacitor 20 in series. The capacitor 20 is connected to a restoring circuit 22 which may be a switching means, for example, a distributor. Closing of the restoring circuit 22 short circuits the capacitor 20 through a discharging resistor 24.

The output of the capacitor 20 is applied to one input of a two-input "and" circuit 30, the other input of which is connected to power source 32. The output of the "and" circuit 30 is taken across the output terminals 34, completing a circuit to ground 14.

In operation, the circuit of FIGURE 1 is included in a card reading machine (not shown). A perforated card, more clearly seen in connection with FIGURE 3 below, travels between the brush 10 and the contact roll 12. When a perforation arrives at the sensing brush 10, a circuit from the source of potential 16 and contact roll 12 is completed through the brush 10, the resistor 18 and the capacitor 20 to ground 14. Capacitor 20 charges up toward the value of the potential source 16, enabling the "and" gate 30. At the occurrence of a power pulse from power source 32 the enabled "and" gate 30 passes a pulse which may be detected at the output terminals 34. The switching means 22 is then actuated, short-circuiting the capacitor 20 to ground 14 through discharging resistor 24.

The restoring or switch means 22 discharges the capacitor 20 so that the several rows of the card may be sensed sequentially. In any row sensing cycle, the capacitor 20 is discharged by the restoring circuit 22 before the brush 10 engages the perforation position. If no perforation is present, the capacitor 20 remains discharged. The "and" gate 30 is thus disabled and therefore closed to power pulses. If a perforation 62 is present, the brush 10 and contact roll 12 complete a charging circuit, the capacitor 20 charges, the "and" gate 30 is enabled, and, when a power pulse is applied to the "and" gate 30, an output pulse appears at the output terminals 34.

Figure 2:
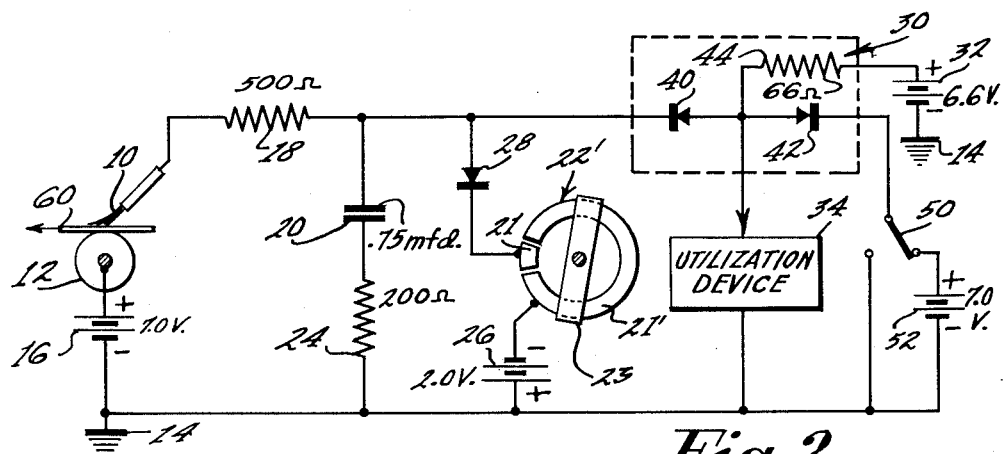
FIGURE 2 is a diagram of one embodiment of the present invention in which diode gating is used.

FIGURE 2 is a circuit diagram of a perforation sensing circuit according to the present invention. A brush 10 is mounted adjacent a contact roll 12. The contact roll 12 is connected to a source of potential 16, which is connected to a common conductor 14 indicated by the conventional ground symbol. A first resistor 18 is connected in series with the brush 10 and a charging capacitor 20 the values of which determine the time constant of the charging circuit. The charging capacitor 20 is connected to ground 14 through a second resistor 24 which determines the time constant of the discharging circuit.

A restoring circuit 22' including a rectifying element or diode 28 is connected in a short-circuit path across the terminals of the capacitor 20. The restoring circuit 22' may be a commutator which may have a ring with two segments 21, 21' that are connected together electrically by a rotating contact arm 23.

A source of restoring potential 26 facilitates discharge of the capacitor 20 and may be included between the commutator 22' and ground 14.

One input of a two-input "and" gate 30 comprising two series-connected diodes 40 and 42 is connected to the capacitor 20, presenting high impedance to current from the capacitor 20. A source of power voltage 32 connects to the "and" gate 30 through a resistor 44 of "and" gate 30 which connects with the junction point of the anode of the "and" gate diodes 40, 42. The diodes 40, 42 are faced to present low impedance paths from the power source 32.

An input terminal for clock or control pulses may be represented by a switch 50 which connects to ground 14 in one position and to the positive terminal of a power source 52 in another position. The negative terminal of power source 52 is connected to ground 14. A utilization element 34, which may be the input winding of the magnetic core having square-type hysteresis characteristics, is connected between the junction of the diodes 40, 42 (the "and" gate 30 output) and ground 14.

During operation, cards 60 are transported between the brush 10 and the roll 12. The brush 10 completes a circuit to the contact roll 12 through a perforation in the card 60. The source of potential 16 provides a current flow through the resistors 18 and 24 to charge the capacitor 20. The discharge path for the capacitor 20 includes the high impedance of the diode 40 of the "and" gate 30. The diode 28 provides a low impedance to the capacitor 20, but the distributor 22' is open-circuited except when discharging.

The charge on the capacitor 20 provides a back biasing voltage to the diode 40 of the "and" gate 30. However, the source of power 32 normally has a ready conduction path through the resistor 44, the diode 42, and the switch 50 to ground 14.

The occurrence of the clock pulse may be represented by the rearrangement of the switch 50 as shown for an interval of limited duration, thereby introducing the source of potential 52 into the circuit. The diode 42 is then back-biased, and current does not flow from the source of power 32 through the diode. The only path remaining is the one through device 34. Accordingly, during the interval of the clock pulse, the power source 32 current passes through the input winding of the utilization device 34. If the device 34 is a magnetic core, the current flow is sufficient to change the magnetic state of the core. A "bit" or binary digit of information may thus be stored in the core. Information stored in the core may be utilized in known fashion.

At the termination of the clock pulse and the reversal of the position of the switch 50, the clock source 52 is disconnected from the circuit, and the power source 32 again finds a low impedance circuit to ground 14.

The rotating contact arm 23 of the commutator 22' connects the segments 21, 21' together, shorting the capacitor 20 to ground 14 through the diode 28, the commutator 22', and the restoring bias source 26. The capacitor 20 may discharge to a value slightly negative with respect to ground to insure restoring of the circuit for a subsequent perforation sensing.

In a typical circuit, the circuit values recited in the following Table I give satisfactory results.

*Component values for the circuit of FIG. 2*

TABLE I

| | |
|---|---|
| Voltage source 16 | 7 volts. |
| Clock pulse source 52 | 7 volts for 20 microseconds. |
| Voltage source 26 | 2 volts. |
| Power source 32 | 6.6 volts. |
| Diodes 28, 40, 42 | IN97. |
| Capacitor 20 | 75 microfarads. |
| Resistor 18 | 500 ohms. |
| Resistor 24 | 200 ohms. |
| Resistor 44 | 66 ohms. |

Figure 3:
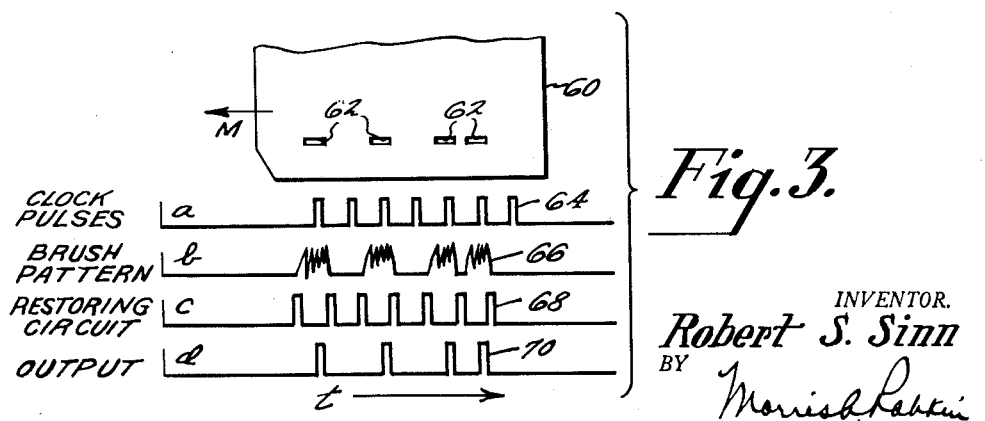
FIGURE 3 is a sketch of a portion of a record member with a time scaled representation of the corresponding clock pulse pattern, brush voltage pattern, restoring circuit pattern, and resultant output pattern.

FIGURE 3 is a view of a portion of a record card 60 having perforations 62. The card may be of the conventional Hollerith type. The brush 10 completes an electrical circuit to the contact roll 12 through the individual perforations 62. With reference to time, the card may be considered as moving from right to left in the direction of the arrow M.

A group of graphs are aligned with the card 60 in which successive time intervals are shown from left to right and which indicate the voltage relationships in the circuit of FIG. 1. On line *a* is a graph of voltage with time indicating the occurrence of clock pulses correlated to the position of the card 60 with respect to the brush 10. On line 6, on the same time axis, the voltage appearing at the brush 10 is indicated. At high card sensing speeds, the resilience of the brush filaments causes a series of vibratory bounces which shows up in the graph as an initial voltage peak followed by an oscillatory pattern.

As may be seen at line *a*, the power gating or clock pulse occurs in the latter portion of the perforation sensing operation. In the event that the brush 10 bounces away from the contact roll 12 and the voltage at the time of application of the clock pulse is near zero at the contact brush, the perforation might not be detected by circuits of the prior art.

At line *c*, the occurrence of discharging pulses is correlated with respect to the position of the card 60. As may be seen, the restoring circuit 22 is closed discharging the capacitor 20 before any perforation position is reached by the brush 10.

At line *d*, on the same time axis, the output signal appearing at the output terminal 34 occurs under control of the clock pulses at line $a$ only when a perforation 62 has been detected, as shown on line $b$.

A complete sensing cycle, therefore, includes the (1) closure of the restoring circuit 22, (2) sensing of a perforation position with the brushes 10, and (3) the application of a clock pulse before the next restoring circuit actuation.

Figure 4:
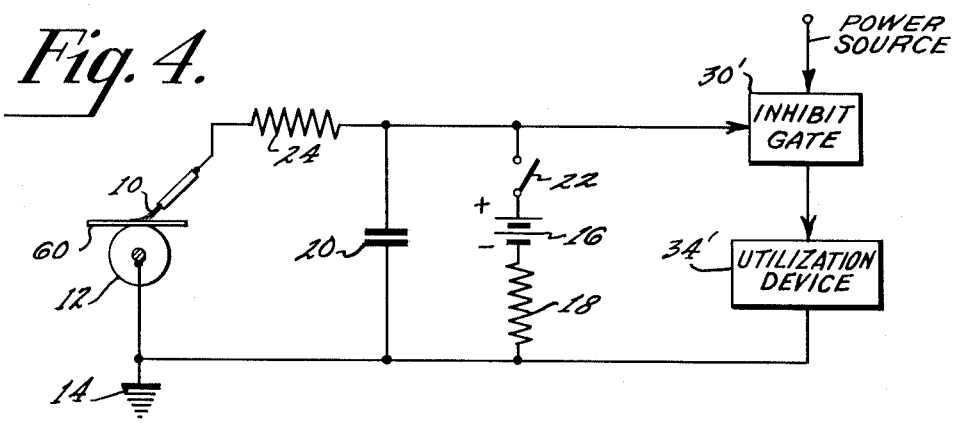
FIGURE 4 is a simplified block diagram of a second arrangement according to the present invention.

In FIGURE 4, an alternative circuit according to the present invention is shown in block form. In the circuit of FIG. 4, the elements of FIG. 1 are interconnected to charge the capacitor 20 with the restoring circuit 22 and to discharge the capacitor 20 through the brush 10 and contact roll 12. To provide an output to the utilization device 34' responsive to the presence of perforations 62 in a card, "except" or inhibitory gate 30' is used in this circuit in place of the "and" gate 30 of FIG. 1.

Should the contact brush 10 encounter a perforation 62 in a card 60, the capacitor 20 is discharged through the short-circuit path including the discharging resistor 24, the brush 10, and the contact roll 12. If no perforation is sensed, the capacitor 20 remains charged, the inhibit input is high, and the gate 30' is closed to power or clock pulses. Sensing of a perforation discharges the capacitor 20. The inhibit gate input is disabled and the power pulse passes the enabled gate 30' to energize the utilization device 34'. As above, the restoring circuit 22 is connected to the capacitor 20 after the clock pulse and, here the capacitor 20 is charged through the charging resistor 18.

Figure 5:
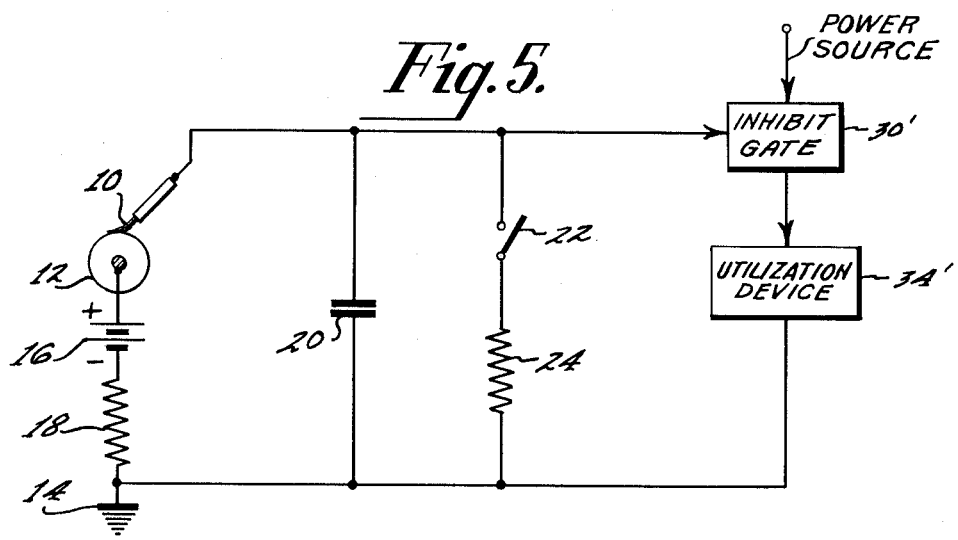
FIGURE 5 is a block diagram of the arrangement of FIG. 1 modified by the inclusion of an "inhibit" gate to produce a complemented output.

FIGURE 5 is another alternative form of circuit according to the present invention in which the gate 30 of the circuit of FIGURE 1 is replaced by the "except" or inhibitory gate 30' of FIG. 4. In the circuit of FIGURE 5 therefore, the detection of a perforation 62 charges the capacitor 20 which applies a level to the inhibit input and closes the gate 30' to the power pulse. Thus, complementary output is provided in which the absence of a perforation produces an output pulse to the utilization device 34'.

Figure 6:
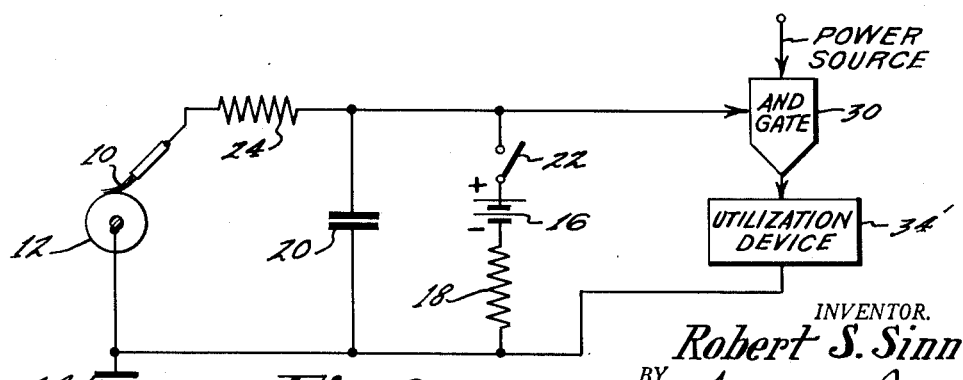
FIGURE 6 is a diagram of the arrangement of FIG. 4 modified by the inclusion of an "and" gate to produce a complemented output.

FIGURE 6 is an alternative configuration of the circuit of FIG. 4 in which the "and" gate 30 of FIG. 1 replaces the "inhibitory" gate 30' of FIG. 4. The other components of FIG. 4 are unchanged and the operation will be clear from the foregoing description.

The signal output of the circuit of FIGURE 6 may be considered the complement of the output of the circuit of FIGURE 4, for the reading of like information. The occurrence of an output pulse in the circuit of FIGURE 4 represents the presence of a perforation. However, in the circuit of FIGURE 6 the output pulse represents the absence of a perforation.

Figure 7:
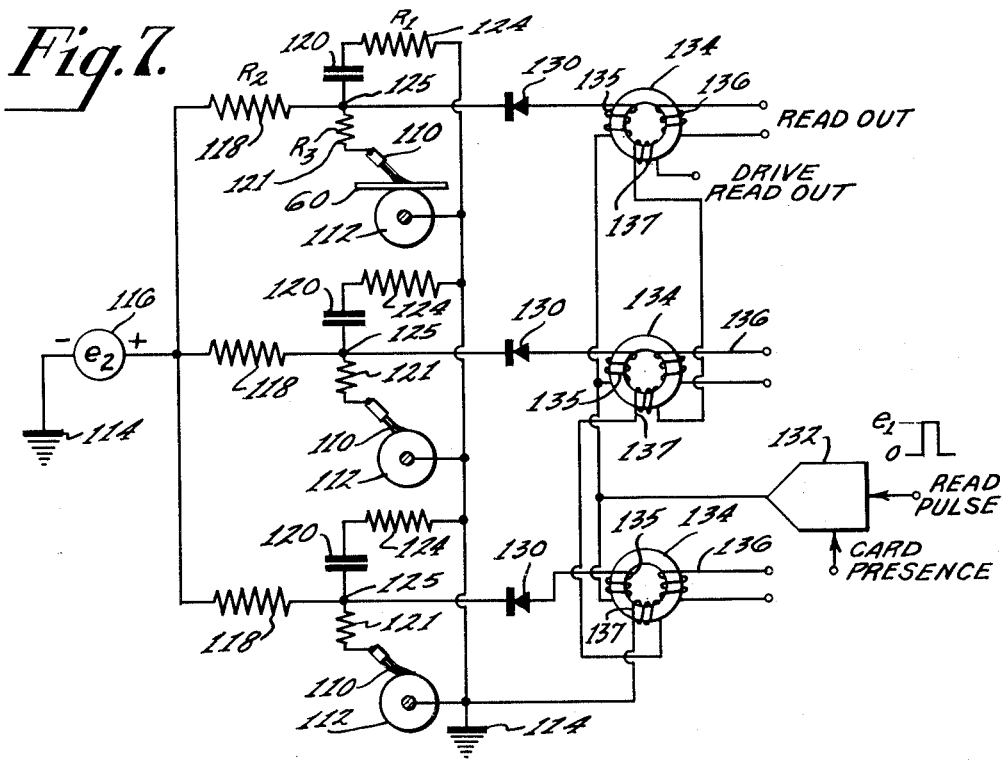
FIGURE 7 is a diagram of an arrangement according to the present invention embodying several circuits of FIG. 4 in combination.

FIGURE 7 is a circuit diagram of another embodiment according to the present invention in which three interconnected sensing circuits are shown. Any desired number of sensing circuits may be added by similar arrangements.

A utilization device, for example a magnetic core 134 having square hysteresis loop characteristics, shown with an input winding 135, an output winding 136, and a drive winding 137. A different core 134 is connected to the output of each perforation sensing circuit. The following description of one of the sensing circuits of FIG. 7 is applicable to each of the others. Parts in common are noted in the description.

A sensing brush 110 cooperates with a contact roll 112 to complete a circuit through a perforation 62 in a record card 60. The contact roll 112 is connected to a common reference potential 114, indicated by the ground symbol. A charging circuit includes a source of charging potential 116 common to all the sensing circuits, a charging resistor 118, a storage capacitor 120 and a discharging resistor 124 which is returned to the common ground 114. A discharge path is provided from the junction 125 of the capacitor 120 and the charging resistor 118 through the brush 110 and the contact roll 112 to the common ground 114.

An isolating diode 130 is connected to present a high impedance path to conventional current flow from the junction 125 and acts as an "except" or "inhibit" gate. The diode 130 anode connects to a utilizatoin device input, for example, to one terminal of the read-in winding 135 of the magnetic core 134.

The other terminal of the read-in or input winding 135 is connected with the like terminals of all the other cores and is connected with the output of a read "and" gate 132. The read "and" gate 132 is enabled by a signal from the card transport mechanism (not shown) when a card 60 is in a position to be read. In one device, a switch located in advance of the line of brushes 10, is closed by the leading edge of the card 60.

A clock or power pulse is applied to the read "and" gate 132 during the sensing of a perforation position by the brush 110, at a time determined by the charging and discharging time constants of the circuits including the capacitor 120. The pulse is timed to occur after discharge through the brush 10 but before the source 116 has charged the capacitor 120 sufficiently to back-bias the diode 130 into the non-conducting condition.

A single read out drive winding 137 threads all of the magnetic cores 134 but a separate output winding 136 is provided for each core 134.

In operation, a card 60 is placed in the card feed mechanism (not shown) and a card present signal is applied to the read "and" gate 132. The unperforated areas of the card separate the brushes 110 from the contact roll 112 and the voltage source 116 charges the capacitors 120 through the resistors 118 before the first perforation row reaches the brushes 110. As the card 60 moves through the reader, the first perforation row arrives under the brushes 110. If a brush 110 encounters a perforation 62, a discharge path is provided for the connected capacitor 120, the time constant of which is short compared to the charging path time constant.

A read, or clock pulse is gated through the read "and" gate 132 and is applied to the input windings 135 of the cores 134. The discharged capacitors 120, in the circuits in which perforations were sensed, present a low impedance load to the diode 130 and sufficient current flows in the winding 135 to switch the magnetic state to the respective cores 134. In the circuits where perforations were not encountered, the charged capacitors 120 present a back bias to the connected diode 130 which appears as a high impedance load to the respective input windings 135 and those cores 134 are unaffected. A read out pulse applied to the read drive windings 137 drives all cores toward the initial state. A pulse is generated in the output windings 136 of the switched cores 134.

The capitors 120 are restored to the charged state by the charge restoring circuit 116, 118, 124, 114, as the brushes 110 traverse the unperforated area of the card 60 between rows of perforations. A charge sufficient to block the diode 130 is built up before the occurrence of the next clock pulse. When no perforation is sensed, the source 116 maintains capacitor 120 charged.

Figure 8:
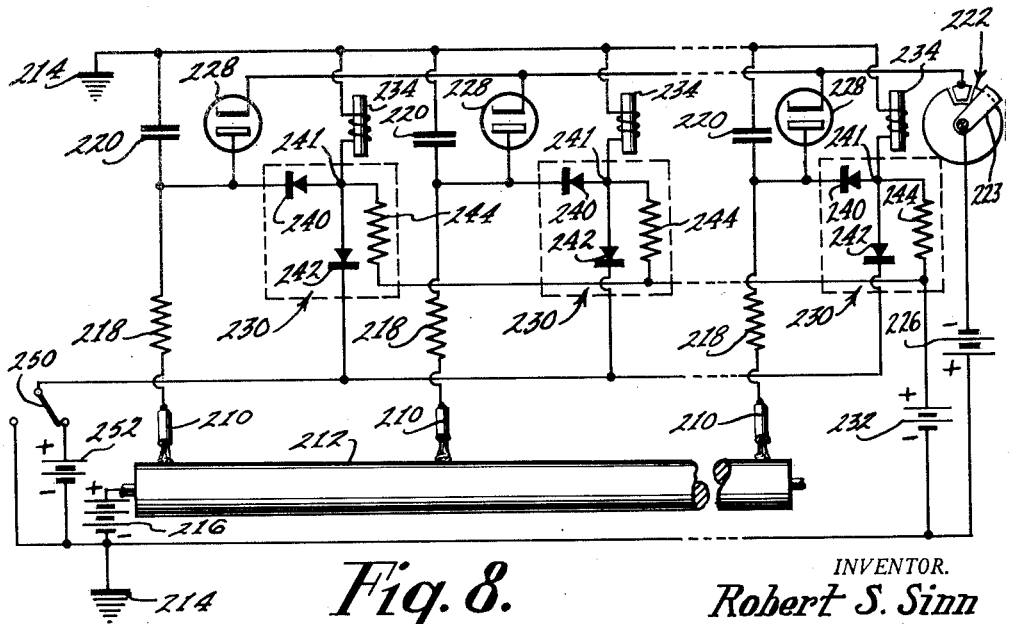
FIGURE 8 is a diagram of an arrangement according to the present invention incorporating several of the circuits of FIG. 2.

FIGURE 8 is a diagram of an alternative circuit combining several of the sensing circuits of FIGURE 2 into a circuit suitable for sensing perforated cards having many columns of perforations. Sensing brushes 210 are mounted next to a contact roll 212. The contact roll 212 is connected to a source of potential 216 which is in turn connected to the common reference potential or ground, indicated by the conventional ground symbol 214.

Each brush 210 is connected to a charging resistor 218 in series with a capacitor 220. The capacitors 220 are connected to the common reference or ground 214.

The junction of each resistor 218-capacitor 220 combination is connected to the anode of a separate vacuum tube diode 228. The cathodes of the vacuum tube diodes 228 all connect to a restoring circuit, for example a discharging commutator 222. A central contacting arm 223 of the discharging commutator 222 is connected to a source of discharging potential 226 which is connected to the common ground 214.

A source of power 232 is connected to a set of "and" gate circuits 230 each connected to a separate utilization device, for example magnetic cores 234. Each "and" gate circuit 230 includes a resistor 244 which connects to the power source 232 and two diodes 240, 242, the anodes of which are connected at a junction 241 to the resistor 244 for easy "conventional" current flow away from the junction 241. The input of each individual utilization device, in this case the input winding 235 of a core 234, connects between each individual junction 241 and the common reference or ground 214.

A source of clock pulses 252, poled as shown and preferably a low impedance voltage source, provides periodic voltage impulses to the "and" circuits 224 at the diodes 242. The diodes 242 are connected to oppose the conventional flow of current from the source 252. For ease of reader understanding the clock pulse source is shown as a switch 250 which is connected to the cathodes of the diodes 242. In one position, the switch 250 connects with the common ground 214 and in another position connects with the source 252.

In operation a perforated card 60 to be read is placed between the brushes 210 and the contact roll 212, and is moved under the brushes 210. At the start of each reading cycle, before the first perforation row of the card 60 reaches the sensing brushes 210, the restoring circuit commutator 222 completes a circuit, discharging all of the capacitors 220 through the vacuum tube diodes 228 and the source of restoring potential 236.

As a perforation is encountered by the brush 210, the completed circuit between the brush 210 and the contact roll 212 allows a current flow through the resistor 218, charging the capacitor 220. A low impedance path is provided through the resistors 244 and the diodes 242 through the switch 250 to ground 214 for current from the source 232. At some time after the perforation area is under the brushes but before the next restoring circuit actuation 216, the switch 250 changes contacts and connects the source 252 into the circuit which blocks off the diodes 242.

The current from the power source 232 now tends to flow through the diodes 240 in those circuits wherein the capacitor 220 remains discharged, in the absence of a perforation at the respective brush 210. However, in those circuits where a perforation has been sensed and the capacitor 220 is charged, current flow through the diode 240 is blocked and a current of sufficient magnitude to switch a core flows through the respective core elements 234.

The switch core 234 may be read out in known fashion at any subsequent time before the next clock pulse and its state is restored. The commutator 222 is timed to discharge all capacitors 220 before the brushes 210 reach a new row of perforation positions.

The components of the circuits of FIG. 8 may have the same values at the corresponding components of the circuit of FIG. 2 as listed in Table I above. The vacuum tube diode used here may be the type sold commercially under the numerical designation 5726.

In one card reading apparatus embodying the circuits of the present invention, cards are transported through the read mechanism at a rate of 400 cards per minute. The well-known statistical punched card having 80 columns and 12 rows of information perforation positions may be used. A spacing equivalent to two rows of perforation positions is provided between the last row of one card and the first row of the next card.

A sensing brush, whose cross-sectional area equals the area of a rectangular perforation, contacts the edge of a new perforation position, each 10.7 milliseconds. The sensing brush 210 is made up of many individual sensing wires, enough of which touch the contact roll 12 through a perforation to complete a useable circuit for almost 6.7 milliseconds of that time. The circuit is open for approximately 4 milliseconds between successive perforation positions.

Using the values of the components of FIG. 7 listed in Table II, the capacitor 120 charges in about 4 milliseconds and discharges through a perforation in about .5 millisecond. The single diode 130 performs the gating function, being closed if the capacitor 120 is charged and opened if the capacitor 120 is discharged. A clock pulse of approximately 50 microseconds duration turns each core 134 connected to a discharge capacitor.

TABLE II

| | |
|---|---|
| Source 116 | 8 volts. |
| Resistor 118 | 8,000 ohms. |
| Capacitor 120 | .4 microfarad. |
| Resistors 124, 121 | 60 ohms. |
| Clock pulse | 6 volts for 50 microseconds duration. |
| Diode 130 | 1N97. |
| Inductance of core 134 | 100 millihenries. |

The time constant of the capacitor-brush-contact roll circuit is short compared to the time allotted for the sensing of a perforation and, therefore, the clock pulse may occur at almost any time before the capacitor is restored, but preferably during the sensing with reliable results. The restoring or switching means also provides a relatively short time constant capacitor restoring circuit, which provides for rapid recovery of the system in preparation for the next perforation row. The circuit voltages of the various sources may be relatively low, on the order of 6 to 12 volts with reliable results.

Thus, there has been disclosed a perforation sensing circuit virtually unaffected by arcing, bounce, or other effects which tend to introduce error into the circuits of the prior art.

What is claimed is:

1. In a device for reading perforations in a record member, said device including a brush and a conductive member between which record member perforations are sensed, a perforation sensing circuit comprising charge storage means permanently connected to said brush and having a first state of charge and a second state of charge, a restoring means connected to said storage means for restoring said storage means to said first state, said storage means being connected to said brush to complete a charge storage path between said storage means and said brush when said brush engages said conductive member whereby said storage means is responsive to brush signals to assume said second state whenever a perforation is sensed, and gating means connected to said storage means and controlled thereby according to the state of charge of said storage means.

2. In a device for detecting perforations in a record member, said device including a brush and a conductive member between which record member perforations are detected and brush signals generated, a perforation sensing circuit comprising a capacitor permanently connected to said brush and having a first and a second state of charge, a restoring means connected to said capacitor for restoring said capacitor to said first state, said capacitor being connected in circuit with said brush and responsive to said brush signal to assume said second state whenever a perforation is detected, and normally disabled gating means connected to said capacitor means and enabled thereby when said capacitor is in said second state.

3. In a device for detecting perforations in a record member, said device including a brush and a conductive member between which record member perforations are detected, a perforation sensing circuit comprising a capacitor permanently connected to said brush to be charged through said brush whenever a perforation is thus detected, a restoring means connected to said capacitor for discharging said capacitor, and a normally disabled "and" gate connected to said capacitor and enabled thereby when said capacitor is charged.

4. In a device for detecting perforations in a record member, said device including a brush and a conductive member between which record member perforations are detected, a perforation sensing circuit comprising a capacitor connected to said brush to be discharged through said brush whenever a perforation is thus detected, a restoring means connected to said capacitor for charging said capacitor, and gating means connected to said capacitor and controlled thereby according to the state of charge of said capacitor.

5. In a device for detecting perforations in a record member, said device including a brush and a conductive member between which record member perforations are detected, a perforation sensing circuit comprising a capacitor connected to said brush to be discharged through said brush whenever a perforation is thus detected, a restoring means connected to said capacitor for charging said capacitor, and gating means connected to said capacitor and controlled thereby according to the state of charge of said capacitor, wherein said gating means is enabled when said capacitor is discharged.

6. In a device for detecting perforations in a record member, said device including a brush and a conductive member between which record member perforations are detected, a perforation sensing circuit comprising a capacitor permanently connected to said brush to be discharged through said brush whenever a perforation is thus detected, a restoring means connected to said capacitor for charging said capacitor, and gating means connected to said capacitor and controlled thereby according to the state of charge of said capacitor, wherein said gating means is disabled when said capacitor is discharged.

7. In a device for detecting perforations in a record member, said device including a plurality of brushes and a contact roll between which record member perforations are detected, a plurality of perforation sensing circuits each connected to a different brush and each comprising a charge storage means connected in circuit with the said brush in that circuit, each said charge storage means having a first and a second state of charge, a restoring means connected to all of said storage means for restoring said storage means to said first state, each of said storage means being thus connected to assume said second state whenever that respective brush detects a perforation and to remain in said first state if that respective brush senses no perforation, and a plurality of normally disabled gating means each connected to a corresponding one of said storage means and enabled thereby when said connected storage means is in its second state.

8. In a device for detecting perforations in a record member, said device including a plurality of brushes and a conductive member between which record member perforations are detected, a plurality of perforation sensing circuits each connected to a different brush and each comprising a capacitor connected for current flow through the brush with which it is connected when that brush is closed and having a first and a second stage of charge, a restoring means connected to said capacitors for restoring said capacitors to said first state of charge, each of said capacitors being thus connected to assume said second state whenever the respective brush detects a perforation and to remain in said first state if the respective brush senses no perforation, and a plurality of gating means each connected to a corresponding one of said capacitors and controlled by the state of its corresponding said capacitor, wherein each said gating means is disabled in response to said first state and enabled in response to said second state of its said corresponding capacitor.

9. In a device for detecting perforations in a record member, said device including a plurality of brushes and a conductive member between which record member perforations are detected, a plurality of perforation sensing circuits each connected to a different brush and each comprising a capacitor connected for current flow through the brush with which it is connected when that brush is closed and having a first and a second state of charge, a restoring means connected to said capacitors for restoring said capacitors to said first state of charge, each of said capacitors being thus connected to assume said second state whenever the respective brush detects a perforation and to remain in said first state if the respective brush senses no perforation, and a plurality of gating means each connected to a corresponding one of said capacitors and controlled by the state of its corresponding said capacitor, wherein said first state of charge is a charged state and said second stage of charge is a discharged state and wherein each said gating means is enabled in response to said discharged stage and disabled in response to said charged state of its said corresponding capacitor.

10. In a device for detecting perforations in a record member, said device including a plurality of brushes and a conductive member between which record member perforations are detected, a plurality of perforation sensing circuits each connected to a different brush and each comprising a capacitor connected for current flow through the brush with which it is connected when that brush is closed and having a first and a second state of charge, a restoring means connected to said capacitors for restoring said capacitors to said first state of charge, each of said capacitors being thus connected to assume said second state whenever the respective brush detects a perforation and to remain in said first state if the respective brush senses no perforation, and a plurality of gating means each connected to a corresponding one of said capacitors and controlled by the state of its corresponding said capacitor, wherein each said gating means is disabled in response to said discharged state and enabled in response to said charged state of its said corresponding capacitor.

11. In apparatus including a perforation sensing element, and a perforated record member movable adjacent to said element; a perforation sensing circuit comprising, in combination, storage means capable of assuming first and second storage states permanently connected to said sensing element; a circuit responsive to the sensing of a perforation by said sensing element for placing said storage means in one of said storage states; normally disabled gate circuit means connected to said storage means and enabled thereby when said storage means is in said one storage state; and a restoring circuit connected to said storage means for restoring the same to its other storage state after said gate is enabled and prior to the time a following perforation is sensed.

12. In apparatus as set forth in claim 11, said gate circuit means comprising an "and" gate having two signal input terminals one of which is connected to said storage means; and further including a clock pulse source connected to the other of said input terminals.

13. In apparatus as set forth in claim 11, said gate circuit means comprising an inhibit gate having two signal input terminals one of which is connected to said storage means; and further including a clock pulse source connected to the other of said terminals.

14. In apparatus including a brush, a conductive member, and a perforated record member movable between the two, a perforation sensing circuit comprising, in combination, storage means capable of assuming first and second storage states permanently connected to said brush; a circuit responsive to engagement of said brush with said conductive member through a perforation for placing said storage means in one of said storage states; a restoring circuit connected to said storage means for restoring the same to its other storage state when said brush does not engage a perforation; and an "and" gate circuit having two signal input terminals one permanently connected to a power source and the other connected to said storage means for producing an output signal only when said storage means is in said one of the storage states.

15. In apparatus including a brush, a conductive member, and a perforated record member movable between the two, a perforation sensing circuit comprising, in combination, storage means capable of assuming first and second storage states permanently connected to said brush; a circuit responsive to engagement of said brush with said conductive member through a perforation for placing said storage means in one of said storage states; a restoring circuit connected to said storage means for restoring the same to its other storage state when said brush does not engage a perforation; and an inhibit gate circuit having two input terminals one connected to a power source and the other connected to said storage means for producing an output signal only when said storage means is in said one of its storage states.

16. In apparatus which includes a plurality of brushes, each for detecting different perforations in a record member, in combination, a plurality of storage means, each capable of assuming first and second storage states, and each permanently connected to a different brush; a circuit individual to each brush and its storage means for placing the storage means in its first storage state each time its brush engages a perforation; a restoring circuit common to all storage means for placing each storage means in its second storage state whenever the brush associated with that storage means does not engage a perforation; and a plurality of normally disabled gate circuit means, one connected to each storage means, and each enabled by its storage means when the latter is in its first storage state.

References Cited in the file of this patent

UNITED STATES PATENTS

| | | |
|---|---|---|
| Re. 20,419 | Lowkrantz | Nov. 27, 1934 |
| 2,514,054 | Hallden | July 4, 1950 |

FOREIGN PATENTS

| | | |
|---|---|---|
| 707,359 | Great Britain | Apr. 14, 1954 |